United States Patent
Darrow et al.

(10) Patent No.: US 11,861,330 B2
(45) Date of Patent: Jan. 2, 2024

(54) MACHINE MEDIATED REQUIREMENT MANAGEMENT IN A SOFTWARE TRIAL MANAGEMENT SYSTEM

(71) Applicant: Vivun Inc., Oakland, CA (US)

(72) Inventors: Matthew James Darrow, Oakland, CA (US); John Robert Bruce, Carson City, NV (US); Mark Stephan Baltzegar, Bloomington, IN (US)

(73) Assignee: Vivun Inc., Oakland, CA (US)

( * ) Notice: Subject to any disclaimer, the term of this patent is extended or adjusted under 35 U.S.C. 154(b) by 91 days.

(21) Appl. No.: 17/705,033

(22) Filed: Mar. 25, 2022

(65) Prior Publication Data

US 2023/0315395 A1 Oct. 5, 2023

(51) Int. Cl.
*G06F 9/44* (2018.01)
*G06F 8/10* (2018.01)
*G06F 16/34* (2019.01)
*G06Q 10/10* (2023.01)

(52) U.S. Cl.
CPC .............. *G06F 8/10* (2013.01); *G06F 16/345* (2019.01); *G06Q 10/103* (2013.01)

(58) Field of Classification Search
CPC ........................................................ G06F 8/10
USPC ........................................................ 717/101
See application file for complete search history.

(56) References Cited

U.S. PATENT DOCUMENTS

| 6,871,232 B2* | 3/2005 | Curie ..................... G06Q 10/06 709/225 |
| 10,796,255 B2* | 10/2020 | Newhouse ........... G06Q 10/101 |
| 2006/0253824 A1 | 11/2006 | Iizuka |
| 2011/0191213 A1* | 8/2011 | Mora ..................... G06Q 40/12 726/28 |
| 2014/0365990 A1 | 12/2014 | Nakao et al. |
| 2016/0100036 A1 | 4/2016 | Lo et al. |
| 2018/0047115 A1 | 2/2018 | Jemiolo et al. |

* cited by examiner

*Primary Examiner* — Evral E Bodden
(74) *Attorney, Agent, or Firm* — Baker Botts L.L.P.

(57) ABSTRACT

In one embodiment, the disclosure provides a computer-implemented method comprising: generating a unique identifier associated with a digital electronic workspace, a project, a first account, and a second account; receiving, from the first account, input granting permissions to a second account; generating initial requirements data; receiving, a second input indicating a first set of one or more of the digital requirement objects to associate with the unique identifier; receiving, from the second account, a third input to generate and digitally store an additional digital requirement object and associating that object with the unique identifier; receiving input indicating consensus that the project should possess all the features described in natural language text summaries represented by the digital requirement objects; and changing a state value of a variable associated with the unique identifier to a new state and displaying an indication of the new state.

20 Claims, 15 Drawing Sheets

*FIG. 3A*

Workspaces 300 +

▼ Contactial
- 1-Month Leverik Trial
- Badtronic Test Drive — 302
- Earlybird POC
- Sandbox Install
- Middware Pilot
- Onsite Testing
- Perfectron POV
▶ DemoDroid
▶ Presalient 1-Month Leverik Trial | Overview Requirements Tasks Attachments Members 309

310  320  330  340  350

-- Actions

Owner — 304
Brian Cooke

Champion
Celia Hernandez

Status
Launched

Description
Evaluating the Contactial product suite

Start
11/1/2021

Due
11/30/2021

Completed
N/A

Progress — 306
● Satisfied: 24  ○ Withdrawn: 2

Pinned — 308    + New    View All

[Contactial.pptx]  [Customer Cas...]  [Contactial Sec...]

Public Feed 311   Comments   History — 324

(BC) Brian Cooke 11-4-21, 12:20 PM
Celia Hernandez it seems like we're
agreed on all the requirements, I'm
going to initiate the launch for our
workspace                    Delete
313

(CH) Celia Hernandez 11-4-21, 12:21 PM
Brian Cooke - sounds good to me,
I'll agree on my side once I take a
quick review                 Delete
313

(GU) Gustav Unger 11-4-21, 12:27 PM
Brian Cooke & Celia Hernandez
confirming I received the invite  Delete
313

(GU) Gustav Unger 11-4-21, 12:29 PM
Brian Cooke reqs look good - let's
launch                       Delete 390
301 website tab

← → C (website.com)

Workspaces 300 +

▼ Contactial
  1-Month Leverik Trial — 302
  Badtronic Test Drive
  Earlybird POC
  Sandbox Install
  Middware Pilot
  Onsite Testing
  Perfectron POV
  ▷ DemoDroid
  ▷ Presalient

301

1-Month Leverik Trial | Overview Requirements Tasks Attachments Members 309 ☐ Present 310               320              330
Owner   304      Champion         Status
Brian Cooke      Celia Hernandez  Launched Description
Evaluating the Contactial product suite Start            Due              Completed
11/1/2021        11/30/2021       N/A Progress    306
● Satisfied: 24   ○ Withdrawn: 2

Pinned  308                                    + New  View All
[Contactial.pptx]   [Customer Cas...]   [Contactial Sec...]

--Actions    340

Public Feed  311    Comments    History
                                         324
350
318 (BC) Brian Cooke completed the "1-Month
         Trial" workspace
         November 22, 2021, 5:26 PM 318 (BC) Brian Cooke completed the "1-Month
         Trial" workspace
         November 22, 2021, 4:44 PM 318 (BC) Brian Cooke updated the status on
         req. "24x7 tech support" to "Satisfied"
         November 22, 2021, 3:36 PM (BC) Brian Cooke updated the status on
         req. "24x7 tech support" to "Partially
         Satisfied"
         November 22, 2021, 3:36 PM (BC) Brian Cooke updated the status on
         req. "A/B testing tools" to "Satisfied"
         November 22, 2021, 3:36 PM

| Name = 367 | Owner = | Status = | Priority = | Assigned to = | Date = |
|---|---|---|---|---|---|
| Set up chat box | Amelia Elena | Complete | High | Brian Cooke | 11/1/2021 |
| Send custome... | Amelia Elena | Complete | Medium | Amelia Elena | 11/1/2021 |
| Test schedule... | Amelia Elena | Complete | Medium | Celia Hernandez | 11/2/2021 |
| Review custo... | Brian Cooke | Complete | Low | Gustav Ungar | 11/3/2021 |
| Call tech supp... | Brian Cooke | Complete | Medium | Gustav Ungar | 11/8/2021 |
| Chat with the... | Celia Hernandez | Incomplete | Urgent | Amelia Elena | 11/9/2021 |
| Legal team int... | Amelia Elena | Incomplete | High | Amelia Elena | 11/15/2021 |
| Legal sign-off | Amelia Elena | Incomplete | Medium | Brian Cooke | 11/16/2021 |
| IT sign-off | Amelia Elena | Incomplete | Medium | Gustav Ungar | 11/17/2021 |
| Procurement i... | Amelia Elena | Incomplete | High | Celia Hernandez | 11/18/2021 |
| Schedule exe... | Amelia Elena | Incomplete | Urgent | Amelia Elena | 11/19/2021 |
| Deliver exec p... | Amelia Elena | | | | 11/26/2021 |

FIG. 3H

| Name ↑ ≡ 351 | Type 352 | Status ≡ 353 | Email 354 |
|---|---|---|---|
| Amelia Elena | Internal | Active | amelia.elena@contacial.com |
| ⁂ Brian Cooke | Internal [Owner] | Active | brian.cooke@contacial.com |
| Brian Cooke | Guest | Active | brian.cooke@leverik.com |
| Brian Fenn | Internal | Active | brian.fenn@contacial.com |
| ⁂ Celia Hernandez | Guest [Champion] | Active | brian.cooke+champion@co... |
| Chris Hoffman | Guest | Active | jacob.julian+champion@co... |
| Clay Killgore | Internal | Active | clay.killgore@contacial.com |
| Cory Bellinger | Guest | Active | katherine.giroux+champion... |
| Doug Patterson | Internal | Active | doug.patterson@contacial... |
| Gustav Ungar | Guest | Active | brian.cooke+guest@contac... |
| Jacob Julian | Internal | Active | jacob.julian@contacial.com |
| Katherine Grioux | Internal | Active | katherine.giroux@contacial... |
| Lauren Mertz | Guest | Active | taylor.bukowski+champion... |

MACHINE MEDIATED REQUIREMENT MANAGEMENT IN A SOFTWARE TRIAL MANAGEMENT SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2022 Vivun Inc.

TECHNICAL FIELD

One technical field of the present disclosure is database and file management within networked computing environments, including machine mediated requirement management in a software trial management system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer-implemented databases and file systems, interoperating with application programs, form the foundation of numerous practical applications of computing in many contexts. Decision support, project support, and task support relating to the process of marketing and selling a product is one context that could involve database and file management in networked computer environments.

"PreSales" is a term for sales processes and transactions that occur before a service, product, or asset is released to a general market, typically in the context of business-to-business sales rather than for consumer products, and often in the high-tech field. PreSales teams may comprise Sales/Solutions Engineers (SEs), Solution Consultants (SCs), or other team members who support sales teams in qualifying or progressing new and existing customers through a funnel to deal closing. PreSales practitioners may be responsible for, among other things, technical demonstrations, requests for proposal (RFPs), proof of concepts (POCs), discovery, introductory demonstrations, product knowledge improvement, planning or architecture solutions, consulting calls, customer support, or Frequently Asked Questions (FAQs).

The product evaluation is a central component of the pre-sales process in modern B2B software buying. In a product evaluation, a prospect may receive temporary access to a product, typically software, to determine whether the product will work well for the prospect's intended purpose. Evaluation can involve a reduced feature set or a limited number of users, records, storage, or other resources. The features or other aspects of the software that the prospect may need or want—what a software trial or evaluation can test for—are known as "requirements." When requirements are clear and concise, software engineering teams can more easily develop a product that the prospect is willing to buy. On the other hand, having poorly defined requirements can result in scope creep, increased costs, delays, or a lower-quality final product that does not meet the prospect's needs. Ultimately, mistakes or miscommunications related to software requirements can result in lost sales or unhappy customers.

However, managing the definition and completion of requirements for an evaluation is not simple. Before a requirement is entered or accepted as part of an evaluation, it may need review and approval through a chain of multiple reviewers. Many accounts, computers, or users of a prospect may need to view the requirement. The evaluation of each requirement can involve multiple different stages or states, yet existing solutions have not provided a way to track how a requirement is progressing in an evaluation. Consequently, extensive datasets can be developed around requirements, but present solutions do not provide good ways to manage and control these datasets. The relevant technical issues include a lack of sufficient computer-based methods to manage requirements in a manner that promotes alignment, efficiency, and accountability. Additional relevant technical issues include the inability of humans to organize and filter large amounts of electronically stored requirements data and/or effectively leverage electronically stored information related to previous evaluations to efficiently create a framework through which a present evaluation can be conducted.

If a technical solution could be developed to effectively address the aforementioned issues, then it would represent a significant advance in the state of the art.

BRIEF DESCRIPTION OF THE DRAWINGS

In the drawings:

FIG. 3A illustrates an example computer display device that has rendered and is displaying a graphical user interface having an overview tab of a digital electronic workspace associated with a project, a first account, and a second account, the overview tab featuring a plurality of comments.

FIG. 3B illustrates an example computer display device that has rendered and is displaying a graphical user interface having an overview tab of a digital electronic workspace associated with a project, a first account, and a second account, the overview tab featuring a representation of an electronic historical record.

FIG. 3D illustrates an example computer display device that has rendered and is displaying a graphical user interface having a prompt for changing the state of a digital electronic workspace to a "launched" state such that new digital requirement objects can only be associated with the workspace responsive to receiving input indicating two-party assent, in one embodiment.

FIG. 3E illustrates an example computer display device that has rendered and is displaying a graphical user interface for changing the status of a digital requirement object stored in computer memory, in one embodiment.

FIG. 3G illustrates an example computer display device that has rendered and is displaying a graphical user interface having a prompt for an account to provide assent to a new digital requirement object being added to a digital electronic workspace "post-launch," in one embodiment FIG. 3H illustrates an example computer display device that has rendered and is displaying a graphical user interface having a "task" tab of a digital electronic workspace, in one embodiment.

FIG. 4A illustrates an example computer display device that has rendered and is displaying a graphical user interface having a "members" tab of a digital electronic workspace, in one embodiment.

FIG. 4C illustrates an example computer display device that has rendered and is displaying a graphical user interface having a prompt for adding a tag to a digital requirement object, in one embodiment.

DETAILED DESCRIPTION

Figure 1:
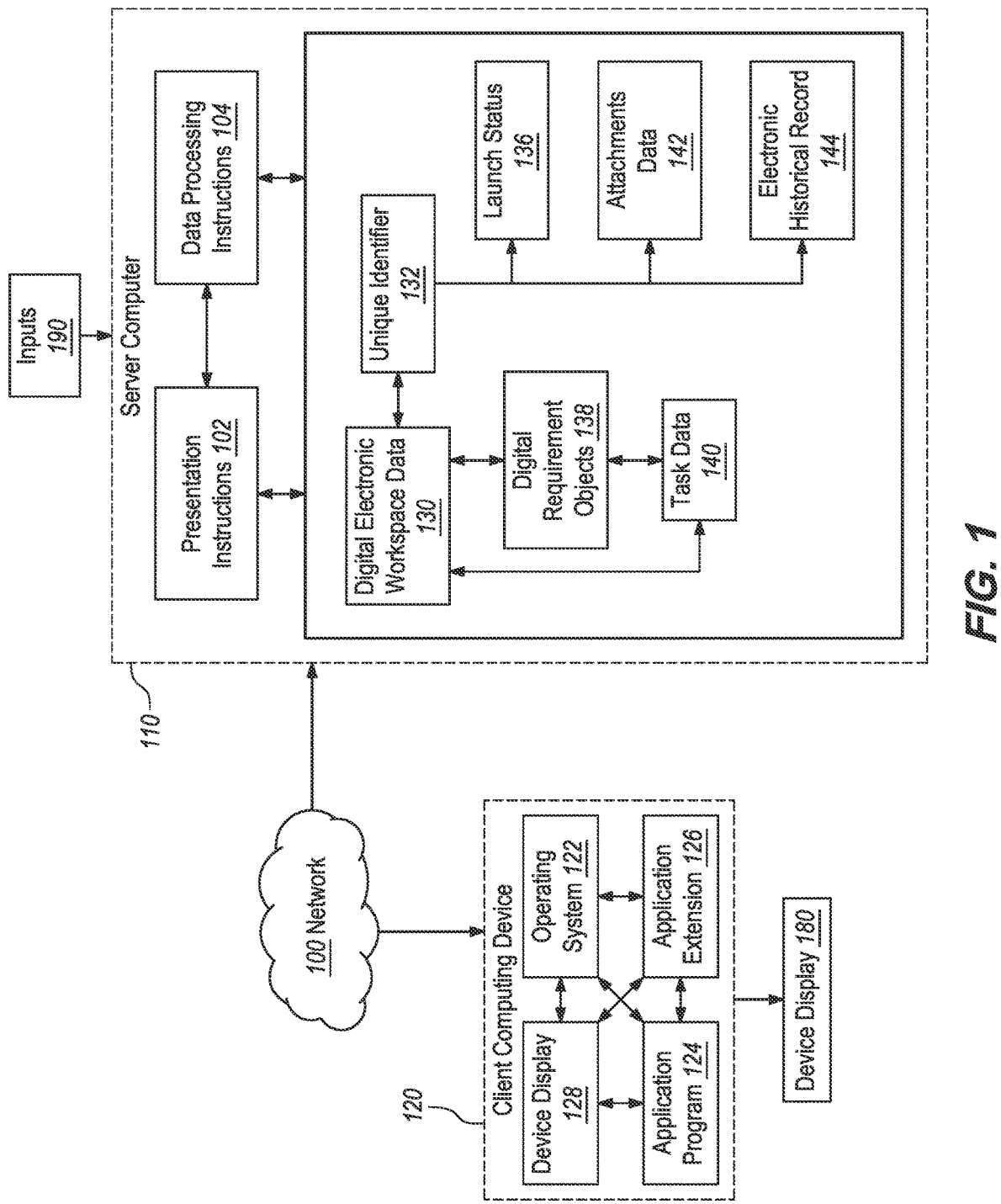
FIG. 1 illustrates a distributed computer system showing the context of use and principal functional elements with which one embodiment could be implemented.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1.0 General Overview
   2.0 Structural & Functional Overview
   3.0 Machine Mediated Requirement Management in a Software Trial Management
   4.0 Implementation Example—Hardware Overview 1.0 General Overview In one embodiment, the disclosure provides computer-implemented techniques for machine mediated requirement management in a software trial management system. In one embodiment, the disclosure provides a programmed online distributed computer system or platform implemented via client-server Software as a Service (SaaS) techniques that executes, among other processes, computer-implemented database management and file management techniques, in particular requirement management techniques relating to product evaluations. Embodiments are programmed to centralized, normalized storage of requirements definitions associated with a software trial, where two-party commit operations are required when a requirement is added after the launch of the trial. Embodiments can also be programmed to automatically update visual progress bars in one or more of a trial management display, as seen by a prospect, target, or customer, and a consolidated display of multiple trial management records, as seen by a sales engineer or other staff of a seller or vendor who is managing multiple customers or trials, workspaces, and requirements tagging or labeling.

In one embodiment, the disclosure provides methods and distributed computer systems that are programmed to generate and manage a digital electronic workspace that facilitates defining, viewing, approving, and managing product requirements, and allowing software vendors to guide prospects through an evaluation process. In particular embodiments, the disclosure provides a trust-free systematic online framework that allows both vendors and their pre-sales teams, as well as prospects or buyers, to be held accountable. Traditional PreSales processes may involve a PreSales team and a prospect each keeping track of software requirements on separate spreadsheets which can become misaligned, outdated, or filled with errors. Thus, one technical advantage of the disclosure over state-of-the-art techniques is that centralized storage and management of requirements produces more accurate data that can be more efficiently used or transmitted to other processes.

While transparency and alignment are important to enable prospects to efficiently manage data associated with an evaluation, they are also essential for members of the selling organization. Hence, the disclosure provides computer-based systems and methods for improving data processing efficiency of enterprise organizations such as Sales, Pre-Sales, and Customer Success. For example, in an embodiment, the disclosure provides an electronic historical record that documents the changes that are made to the digital electronic workspace. Queries can be transmitted to a database of historical records to allow customer service team members to efficiently determine which account made a particular change to a particular requirement, thereby saving computing resources and bandwidth that might otherwise need to be spent searching through gigabytes of emails or spreadsheets to effectively service a customer account, and representing a distinct technical advantage.

In another example, the disclosure provides computer-based systems and methods for leveraging the institutional knowledge and experience of veteran pre-sales leaders. For example, in particular embodiments, the disclosure provides a library of requirements and associated tags that can be pulled from by new pre-sales team members to form initial requirements data for a new project or product. Thus, the disclosed library of particular embodiments allows a pre-sales team to build out requirements while saving computing resources and bandwidth that might otherwise need to be spent manually or algorithmically searching through digital records of previous evaluations, thereby improving the functioning of one or more computing devices.

In one embodiment, the disclosure provides a computer-implemented or programmed method, comprising: generating and digitally storing, in computer memory, a unique identifier associated with a digital electronic workspace, the digital electronic workspace being associated with a project, a first account, and a second account; receiving, from the first account, a first input formatted to grant a plurality of permissions to the digital electronic workspace to a second account; generating and digitally storing, in the computer memory, initial requirements data comprising a plurality of digital requirement objects, each digital requirement object comprising a digital electronic representation of a natural language text summary, each natural language text summary describing a potential feature of the project; receiving, from the first account or a third account associated with the first account, a second input indicating a first set of one or more of the digital requirement objects; responsive to receiving the second input, associating the first set of one or more of the digital requirement objects with the unique identifier; receiving, from the second account, a third input to generate and digitally store an additional digital requirement object in the computer memory; associating the additional digital requirement object with the unique identifier; receiving, from the first account and the second account respectively, a fourth input and a fifth input, each of the fourth input and the fifth input indicating a consensus that the project should possess each potential feature described in each natural language text summary digitally represented by each digital requirement object associated with the unique identifier; responsive to receiving the fourth input and the fifth input, changing a state value of a variable associated with the unique identifier from a prior state to a new state, the new state indicating that new digital requirement objects can only be associated with the unique identifier responsive to receiving a digital input indicating assent from each of the first account and the second account; and displaying, in a graphical user interface (GUI), an indication that the state value of the variable has been changed to the new state.

In one embodiment, the unique identifier is further associated with workspace data stored in computer memory, the workspace data being formatted to represent in the computer memory a workspace name, a description, a start date, and a due date, and the workspace name and the description each comprising natural language text.

One embodiment includes: storing, in a database, a set of digital requirement objects comprising the plurality of digital requirement objects comprised by the initial requirements data, certain ones of the digital requirement objects of the set of digital requirement objects being associated with one or more tags, respectively; receiving, from the first account, a sixth input selecting one or more particular tags; and causing to be displayed, in the GUI, one or more particular digital requirement objects that are associated with one or more of the one or more particular tags.

One embodiment includes: receiving, from the second account or a fourth account associated with the second account, a seventh input indicating that the project possesses a specific feature described in a specific natural language text summary digitally represented by a specific digital requirement object associated with the unique identifier; and responsive to receiving the seventh input, displaying, in the GUI, an indication that the second account or the fourth account has determined that the project possesses the specific feature.

One embodiment includes: digitally storing, in a database, an electronic historical record documenting a set of changes made to the digital electronic workspace, the set of changes documented by the electronic historical recording including changes made responsive to the third input, the fourth input, and the fifth input and comprising a representation of a particular account that initiated each change of the set of changes, respectively; and displaying, in the GUI, a representation of the electronic historical record.

One embodiment includes: receiving, from each of the first account and the second account, an eighth input and a ninth input, respectively, each of the eighth input and the ninth input indicating that the project possesses each feature described in each natural language text summary digitally represented by each digital requirement object associated with the unique identifier; and responsive to receiving the eighth input and the ninth input, displaying, in the GUI, an indication that the first account and the second account each has determined that the product possesses each feature described in each natural language text summary digitally represented by each digital requirement object associated with the unique identifier.

In one embodiment, the digital electronic workspace associated with the unique identifier is a first digital electronic workspace of a set of one or more digital electronic workspaces.

One embodiment includes: displaying, in a panel of the GUI, one or more links to the one or more digital electronic workspaces of the set of digital electronic workspaces, respectively; and displaying, in the panel of the GUI, one or more progress bars corresponding to the one or more links, the one or more progress bars indicating a completion level of the corresponding one of the one or more digital electronic workspaces of the set of digital electronic workspaces.

In one embodiment, the disclosure provides one or more computer-readable non-transitory storage media storing instructions operable when executed by one or more processors to cause performance of the computer-implemented methods described herein with greater specificity.

In one embodiment, the disclosure provides a system comprising: one or more processors; and one or more computer-readable non-transitory storage media coupled to one or more of the processors and storing instructions operable when executed by one or more of the processors to cause the system to perform operations comprising the computer-implemented methods described herein with greater specificity.

All references to "accounts" or "users" in this disclosure, refer to manipulation of human-computer interfaces to provide data to a computer system, and/or programmatic action by user accounts or user computers interoperating with a system, and not to human action in the abstract. User accounts may be programmatically granted permissions to a digital electronic workspace through an invitation process such as by an "owner" of a digital electronic workspace sending an email invitation and link to an email address associated with a particular user account. Depending on the particular permissions granted to the account, the user of that account may be able to transmit input to the platform formatted to cause responses as described further herein with more specificity, those responses including, but not limited to, the creation of one or more digital requirement objects and association of those requirement objects with the digital electronic workspace or its unique identifier, changing a state value of a variable that indicates a status of the workspace, assigning tags to a requirement, initializing a task associated with a requirement, uploading an attachment to a workspace, or inviting additional users to a workspace. Furthermore, in some embodiments, tasks can be associated with any of a requirement, workspace, or organization.

2.0 Structural & Functional Overview

FIG. 1 illustrates a distributed computer system showing the context of use and principal functional elements with which one embodiment could be implemented. FIG. 1, and the other drawing figures and all the descriptions and claims in this disclosure, are intended to present, disclose, and claim a wholly technical system with wholly technical elements that implement technical methods. In the disclosure, specially programmed computers, using a special-purpose distributed computer system design, execute functions that have not been available before in a new manner using instructions ordered in a new way, to provide a practical application of computing technology to the technical problem of machine mediated requirement management in a software trial management system. Every step or operation that is functionally described in the disclosure is intended for implementation using programmed instructions that are executed by a computer. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous. Certain aspects of the disclosure may involve or relate to certain non-technical contexts such as PreSales support, and a description of those contexts is appropriate to orient the reader to the technical improvements of the disclosure, but the specification and claims are not directed to those concepts in the abstract and are intended to be interpreted as directed to only the technical processes that are recited.

In one embodiment, a distributed computer system comprises a server computer 110 that is communicatively coupled to client computing device 120 over network 100. Network 100 broadly represents any combination of one or more data communication networks including local area networks, wide area networks, internetworks, or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The server computer 110, the client computing device 120, and other elements of the system may each comprise an interface compatible with the network 100 and may be programmed or configured to use standardized protocols for communication across the networks such as TCP/IP, Bluetooth, or higher-layer protocols such as HTTP, TLS, and the like.

In one embodiment, client computing device 120 may be a computer that includes hardware capable of communicatively coupling the device to one or more server computers, such as server computer 110, over one or more service provides. For example, the client computing device 120 may include a network card that communicates with server computer 110 through a home or office wireless router (not illustrated in FIG. 1) that is communicatively coupled to an internet service provider. The client computing device 120 may be a smartphone, personal computer, tablet computing device, PDA, laptop, or any other computing device capable of transmitting and receiving information and performing the functions described herein.

In one embodiment, the client computing device 120 may comprise device memory 128, operating system 122, application program 124, and application extension 126. In one embodiment, client computing device 120 hosts and executes the application program 124, which the client computing device 120 may download and install from server computer 110, an application store, or another repository. The application program 124 is compatible with server computer 110 and may communicate with the server computer 110 using an app-specific protocol, parameterized HTTP POST and GET requests, and/or other programmatic calls. In some embodiments, application program 124 comprises a conventional interne browser application that is capable of communicating over network 100 to other functional elements via HTTP and is capable of rendering dynamic or static HTML, XML, or other markup languages, including displaying text, images, accessing video windows and players, and so forth. In embodiments, server computer 110 may provide an application extension 126 for application program 124 through which the aforementioned communication and other functionality may be implemented. In some embodiments, a device display 180, such as a screen, may be coupled to the client computing device 120. In one embodiment, device memory 128 may digitally store one or more items depicted as being stored in memory 111.

The server computer 110 may be implemented using a server-class computer or other computer having one or more processor cores, co-processors, or other computers. The server computer 110 may be a physical server computer and/or virtual server instance stored in a data center, such as through cloud computing. In one embodiment, server computer 110 may be implemented using two or more processor cores, clusters, or instances of physical machines or virtual machines, configured in a discrete location, or co-located with other elements in a datacenter, shared computing facility, or cloud computing facility.

In some embodiments, client computing device 120 is only one of a number of client computing devices interconnected with server computer 110. There may be potentially many more client computing devices employed in executing the systems and methods described herein. On the other hand, some embodiments may not use Client-Server architecture and may instead implement the disclosed programmed processes on-device; thus, the disclosed architecture is exemplary.

Referring again to FIG. 1, in one embodiment, server computer 110 may comprise data processing instructions 104 coupled to both presentation instructions 102 and memory 111. The memory 111 may represent any memory accessible by the server computer 110 including a relational database, a data lake, cloud data storage, local hard drives, computer main memory, or any other form of electronic memory. In various embodiments, server computer 110 may store and execute sequences of programmed instructions of various types to cause execution of various methods. In example only, server computer 110 may execute the data processing instructions 104 and the presentation instructions 102 in various programmed methods, but server computer 110 may also execute other types of programmed instructions in particular embodiments. The data processing instructions 104 may be executed by the server computer 110 to process or transform data, such as by executing a programmed machine learning model, or to cause data stored in memory 111 to be transmitted to client computing device 120 over the network 100. In various embodiments, presentation instructions 102 may be executed by server computer 110 to cause presentation in a display of a computing device communicating with server computer 110 over network 100 (such as client computing device 120) or to cause the transmission of display instructions to such a computing device, the display instructions formatted to cause such presentation upon execution.

Rather than comprising a general-purpose computer, the server computer 110 is specially configured or programmed with the functional elements shown in FIG. 1. In one embodiment, server computer 110 digitally stores digital electronic workspace data 130. In one embodiment, each row of a database storing the digital electronic workspace data 130 represents a single workspace of a plurality of digital electronic workspaces. Each workspace may be digitally stored in memory 111 with a reference to a unique identifier 132 associated with that workspace. In particular embodiments, the workspace data 130 can be formatted to represent in the memory 111 a workspace name, a description, a start date, and a due date, and the workspace name and the description may each comprise natural language text. For example, the workspace start date may be "Nov. 1, 2021," and the workspace end date may be "Nov. 30, 2021." For further example, the workspace name may be "1-Month Leverik Trial," and the description may be "Evaluating the Contactial product suite." Each workspace may be further associated in memory 111 with a launch status 136. In particular embodiments, the launch statuses may comprise: "AwaitingLaunch," "PendingLaunch," "Launched," "PendingCompletion," "Completed," and "Archived." The launch status of a workspace associated with a unique identifier 132 may be digitally updated in memory 111 by changing a state value of a variable to a value that indicates a corresponding launch status 136 for that workspace.

In particular embodiments, sever computer 110 stores a plurality of digital requirement objects 138 in memory 111. Each digital requirement object 138 may comprise a digital electronic representation of a natural language text summary, each natural language text summary describing a potential feature of a project associated with the digital electronic workspace. For example, the project could be a transaction involving a sale of a software product between a selling entity and a buying entity.

In particular embodiments, server computer 110 stores task data 140 in memory 111. Elements of the task data 140 may comprise references to a unique identifier 132 of a particular digital electronic workspace, thereby indicating that those elements are associated with the particular digital electronic workspace. In particular embodiments, task data 140 comprises a digital electronic representation of tasks associated with a digital electronic workspace which are to be performed by a particular user account or set of user accounts associated with the digital electronic workspace or its unique identifier 132. Particular tasks represented in the task data 140 may or may not be associated with certain ones of the digital requirement objects 138. In some embodiments, task data 140 can be associated with a workspace or organization.

In particular embodiments, server computer 110 stores attachments data 142 in memory 111. Elements of the attachments data 142 may comprise references to a unique identifier 132 of a particular digital electronic workspace, thereby indicating that those elements are associated with the particular digital electronic workspace. In example, attachments data may include image files, text files, video files, slideshow presentation files, spreadsheet files, or other types of files which may be relevant to the project associated with the digital electronic workspace.

In particular embodiments, server computer 110 stores an electronic historical record 144 in memory 111. The electronic historical record 144 may document a set of changes made to the digital electronic workspace, the set of changes documented by the electronic historical recording including changes made responsive to inputs received from one or more user accounts and comprising a representation of a particular account that initiated each change of the set of changes, respectively.

Figure 2:
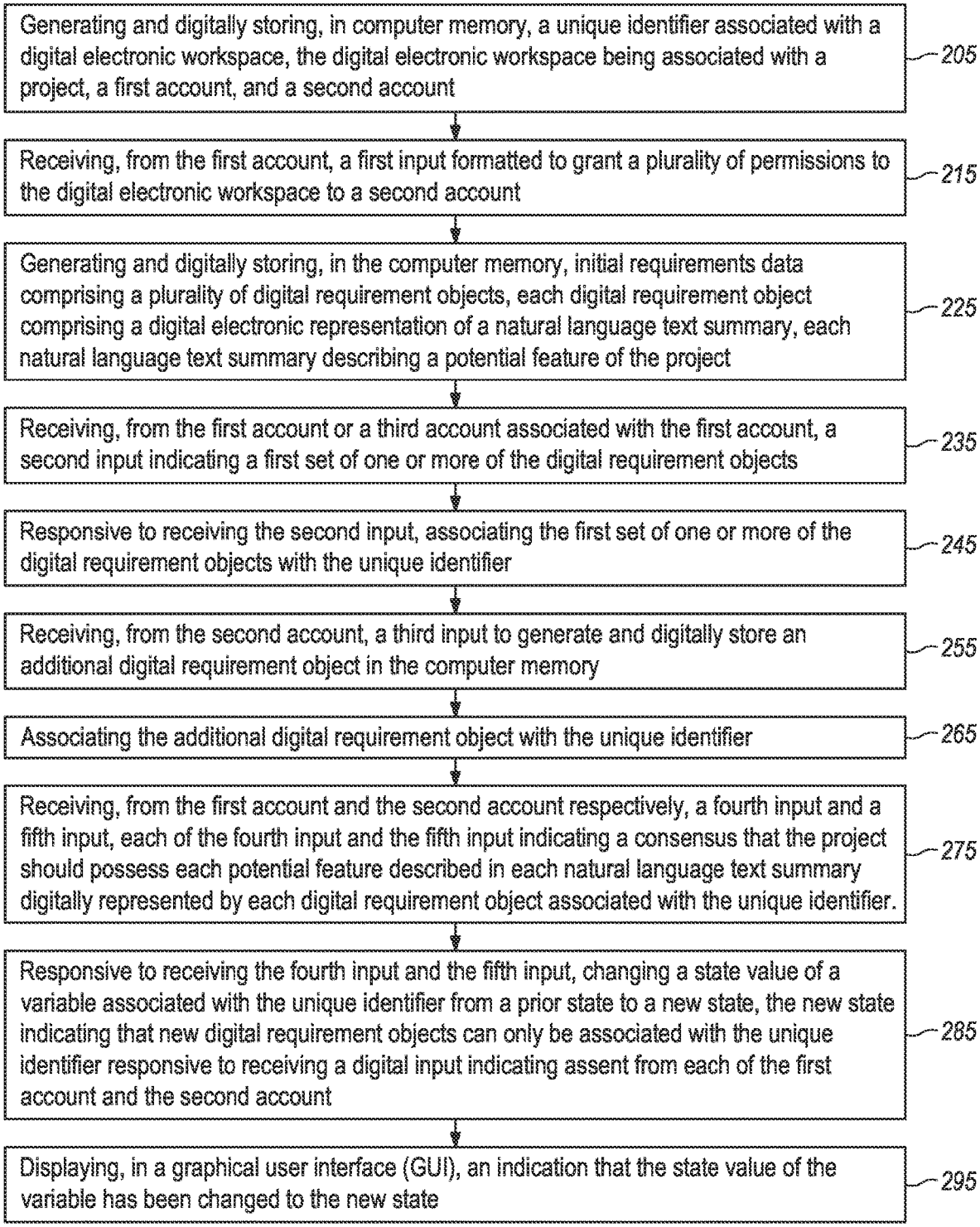
FIG. 2 illustrates an example computer-implemented or programmed process or algorithm for machine mediated requirement management in a software trial management system.

3.0 Machine Mediated Requirement Management in a Software Trial Management System FIG. 2 illustrates an example computer-implemented or programmed process for machine mediated requirement management in a software trial management system. FIG. 2 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

Referring now to FIG. 2, in one embodiment, a process 200 is programmed to start execution at step 205 by generating and digitally storing, in computer memory, a unique identifier associated with a digital electronic workspace, the digital electronic workspace being associated with a project, a first account, and a second account. The unique identifier may be an alphanumeric string, a hashed, encoded, or encrypted value, or another type of digital data which is stored in computer memory and represents digital electronic workspace. In the context of this disclosure, a project can be understood as a joint effort being proposed or undertaken by a first organization or entity associated with the first account and a second organization or entity associated with the second account. For example, the project could be a product, such as a software product that the first organization or entity is developing for the second organization or entity. In further example, the first account may be a first user account, for the digital electronic workspace, of a pre-sales leader or manager employed by or contracted by the first organization or entity. On the other hand, the second account may be a second user account, for the digital electronic workspace, of a manager or responsible party employed by or contracted by the second organization or entity. Thus, the second organization or entity may be a prospective buyer (a "prospect") considering purchasing the software product that the first organization or entity is developing for the second organization or entity.

In particular embodiments, a first account or a second account being associated with the digital electronic workspace means that the program code defining the digital electronic workspace in computer memory contains references identifying each of the first account and second account. In particular embodiments, the unique identifier of the digital electronic workspace is stored in the computer memory with information defining each of the first account and the second account, thereby creating associations between each of the accounts and the digital electronic workspace.

Figure 3C:
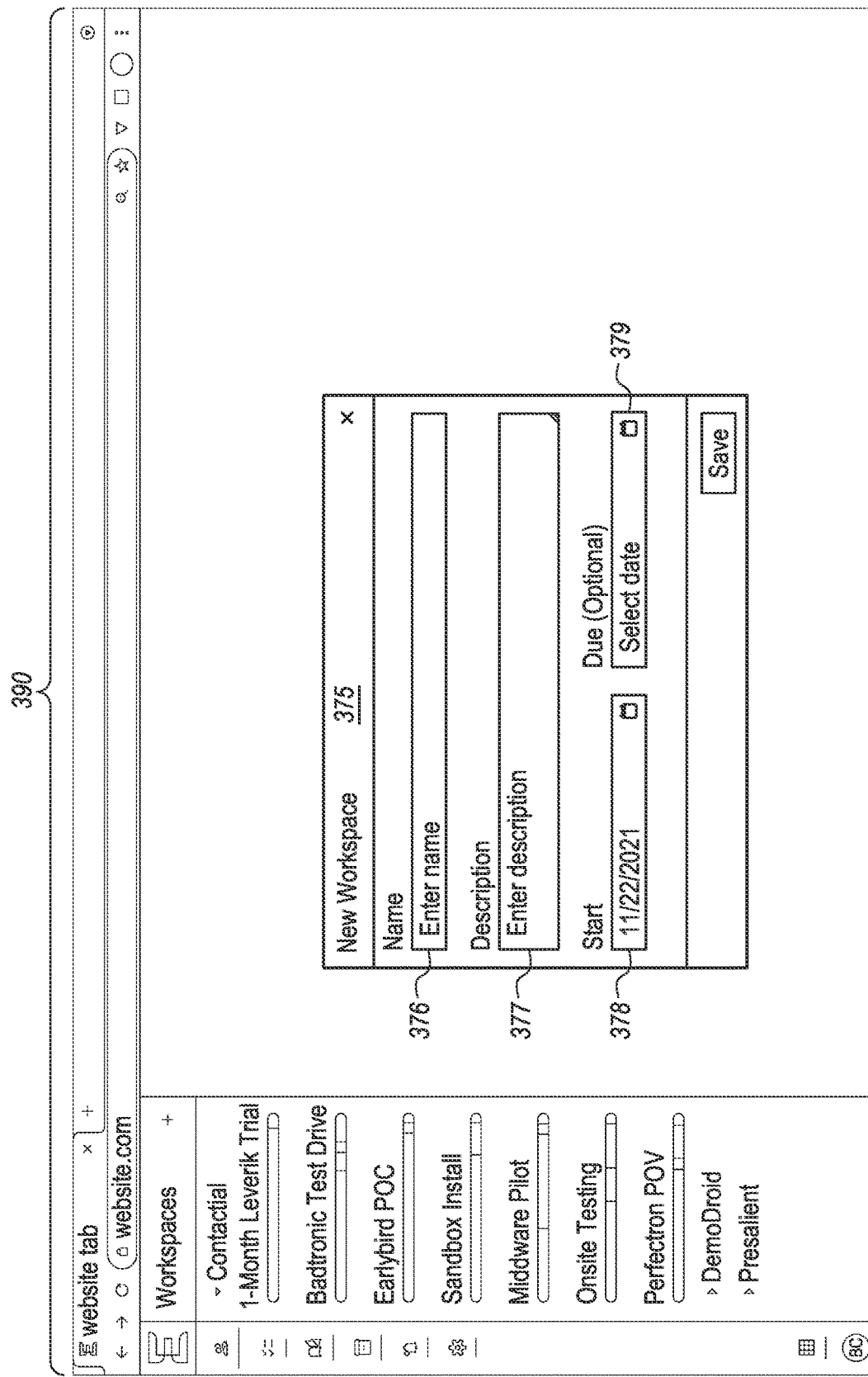
FIG. 3C illustrates an example computer display device that has rendered and is displaying a graphical user interface having a prompt for receiving input to configure a new digital electronic workspace.

FIG. 3C illustrates a prompt for receiving input to configure a new digital electronic workspace, in one embodiment. FIG. 3C depicts a workspace creation panel 375 displayed in a graphical user interface (GUI) 390 which may be rendered by a web browser. In particular embodiments, an input field such as text entry box 376 can be used by the first account to name the workspace, while an input filed such as text entry box 377 can be used to by the first account to provide a description for the workspace. A date input field 378 can be used to enter a start date for the workspace. Moreover, in particular embodiments, a date input field 379 can be used as an optional field to enter a due date for the workspace.

In one embodiment, process 200 is programmed to execute step 215 by receiving, from the first account, a first input formatted to grant a plurality of permissions to the digital electronic workspace to a second account. In particular embodiments, permissions are understood as authorizations to use and change the digital electronic workspace as described further herein with more specificity. A level of permissions granted to a particular account can be stored as a variable in the computer memory associated with the account. Depending on the value of the aforementioned variable, the server computer 110 can execute coded instructions to grant the particular account access to and the ability to change the digital electronic workspace in particular ways as specified by the program code defining the digital electronic workspace.

FIG. 3A illustrates an overview tab of a digital electronic workspace associated with a project, a first account, and a second account, the overview tab featuring a plurality of comments, in one embodiment. FIG. 3A shows example output displayed in a GUI on a device display of a client computing device related to a digital electronic workspace named "1-MONTH LEVERIK TRIAL." The workspace named "1-MONTH LEVERIK TRIAL" is one of several digital electronic workspaces accessible to a first account via a workspace nav 300 that shows progress bars 302 for a plurality of digital electronic workspaces. A workspace information frame 304 displays information related to the workspace, including certain types of information that may have been uploaded using the prompt depicted in FIG. 3C. The depicted workspace information frame shows that the workspace "owner" is Brian Cooke, a first user account associated with the workspace, while the "Champion" is Celia Hernandez, a second user account associated with the workspace. For example, Brian Cooke may be the name of an individual on a pre-sales team of a software vendor and Celia Hernandez may be the name of an individual managing software evaluation and potential purchasing related to a one-month long trial of a software called "Leverik."

FIG. 3A depicts a plurality of buttons which may be used to access various tabs related to the digital electronic workspace: overview button 310 (for accessing an overview tab like the one depicted in FIG. 3A), requirements button 320 (for accessing a requirements tab), tasks button 330 (for accessing a tasks tab), attachments button 340 (for accessing an attachments tab), and members button 350 (for accessing a members tab). Responsive to receiving input indicating a user account selecting a particular one of these buttons, server computer 110 can execute programmed instructions formatted to cause displaying the appropriate corresponding tab of the digital electronic workspace. In particular embodiments, the overview tab also includes one or more side controls 301 which can access other aspects of the digital electronic workspace as explained further herein with greater specificity. And in particular embodiments, a presentation button 309 can be used to hide certain visual elements of the overview tab or other tabs that would otherwise be rendered in the GUI 390, as explained further herein with greater specificity.

FIG. 4A illustrates a "members" tab of a digital electronic workspace, in one embodiment. In particular embodiments, the first input of step 215 is transmitted to the platform by the first account using the "members" tab depicted in FIG. 4A. For example, a user account may select the invite button 391, triggering server computer 110 to display a prompt in the GUI 390. The user account may then submit information in the prompt such as a name, email address, and user type (permissions level) of a user to invite to the workspace, triggering server computer 110 to grant permissions to the digital electronic workspace to the invited user. In particular embodiments, the "members" tab includes information about the user accounts associated with the workspace in a name column 351, a user type (permissions) column 352, an activity status column 353, and an email column 354 displayed in the GUI 390.

Referring again to FIG. 3A, in particular embodiments, the overview tab includes an attachment frame 308 that allows a user account to upload files to the digital electronic workspace. Various types of files may be uploaded including image files, text files, video files, slideshow presentation files, spreadsheet files, or other types of files. FIG. 3A depicts representations of several pdf files and a .pptx that were uploaded to the digital electronic workspace, potentially by selecting the depicted "+new" button and specifying a file path to the desired files.

In particular embodiments, the overview tab includes a progress bar 302 that shows progress made in the workspace on requirements (represented in computer requirement objects). In particular embodiments, each requirement object may take on one of a variety of different requirement statuses such as "AwaitingReview," "UnderReview," "Satisfied," "PartiallySatisfied," "NotSatisfied," "Roadmap," "Exempt," "Withdrawn," or "PendingAgreement." In the present example, each status value can be defined as:

AwaitingReview—the requirement has been entered but is not yet approved as a valid requirement, and the first reviewer in a mandatory approval workflow has not yet viewed the requirement.

UnderReview—the requirement has been entered but is not yet approved as a valid requirement, and one or more reviewers in the approval workflow have viewed the requirement.

Satisfied—the prospect has completed evaluation of the requirement and has agreed that the product satisfies the requirement.

PartiallySatisfied—the prospect has completed evaluation of the requirement and has agreed that the product satisfies a portion of the requirement.

NotSatisfied—the prospect has completed evaluation of the requirement and has signaled that the product does not satisfy the requirement.

Roadmap—the product does not satisfy the requirement, but the requirement has been added to digitally recorded plans for modification of the product.

Exempt—the prospect has completed evaluation of the requirement and has determined that the product does not need to satisfy the requirement, usually because the requirement does not apply to a particular situation or use case.

Withdrawn—the prospect or the vendor entered the requirement but later determined not to consider the requirement in the evaluation.

PendingAgreement—the requirement has been entered and approved by either the prospect or the vendor but not both, and the counterparty needs to manifest agreement to the requirement.

The particular values for status are not critical and other embodiments can use other status values. The status of a requirement may be digitally updated in the computer memory by changing a state value of a variable to a value that indicates a corresponding requirement status for that requirement, for example, by input from an authorized user to select a change in state. Said values may indicate whether designated accounts, such as the first account and the second account associated with the workspace agree that the project or product possesses the feature described in the natural language text summary digitally represented by the requirement object with the particular status. As shown, the progress bar may be displayed along with text that describes how many of the requirement objects of the digital electronic workspace have each of the aforementioned statuses. In particular embodiments, after the number of the requirement objects of the digital electronic workspace with the "Satisfied" status surpasses a threshold number digitally stored in the computer memory, the progress bar can turn green. Similarly, the progress bar can be yellow when a moderate number of the requirement objects are satisfied, and it can be red when few of the requirement objects have been satisfied. Color-coding in this manner is optional and other embodiments can use means other than color to visually communicate a state or change in state.

In particular embodiments, the overview tab includes a public feed that displays at least one of comments or a representation of an electronic historical record. In particular embodiments, comments comprise text or images submitted by user accounts associated with the workspace. In particular embodiments, user accounts associated with the workspace may be alerted whenever they are mentioned in a comment, either through a visual indicator displayed in the GUI 390 or by server computer 110 executing programmed instructions formatted to send an email to the mentioned user. For example, users may be considered mentioned when their name or account name is uploaded in a comment preceding the "@" symbol, for example, "@Brian Cooke." In particular embodiments, users might not receive an email to a registered email address every time they are mentioned in a comment but may instead receive a periodic email digest. In particular embodiments, server computer 110 may be programmed to execute notification/subscription logic within the APOLLO framework.

In particular embodiments, when a user clicks a comments button 312, the platform may execute programmed instructions formatted to display one or more comments 313 as text rendered in the GUI 390. Similarly, in particular embodiments, when a user clicks a history button 314, the platform may execute programmed instructions formatted to display a representation of an electronic historical record as text rendered in the GUI 390. FIG. 3A depicts one example of an overview tab displaying comments 313, for example, after an account has selected the comments button 312.

FIG. 3B illustrates an overview tab of a digital electronic workspace associated with a project, a first account, and a second account, the overview tab featuring a representation of an electronic historical record, in one embodiment. For example, FIG. 3B depicts output that might be displayed in the GUI 390 after a user account selects the history button 314 on the overview tab illustrated in FIG. 3A. In particular embodiments, one or more update notes 318 may be displayed in the public feed 311, the collection of update notes 318 representing the electronic historical record. In particular embodiments, each of the update notes 318 chronicles a change made to the digital electronic workspace as a result of an input received by server computer 110 from a user account associated with the workspace. The update notes 318 may memorialize information such as the name of the user account that made the change—for example, "Brian Cooke"—a date, a timestamp, and a natural language text description of the change. For example, update notes 318 displayed in the GUI 390 may relate to creating a new digital requirement object corresponding to a new requirement for the project or product, changing the status of a requirement, launching the workspace, and the like.

In one embodiment, process 200 is programmed to execute step 225 by generating and digitally storing, in the computer memory, initial requirements data comprising a plurality of digital requirement objects, each digital requirement object comprising a digital electronic representation of a natural language text summary, each natural language text summary describing a potential feature of the project.

Figure 4B:
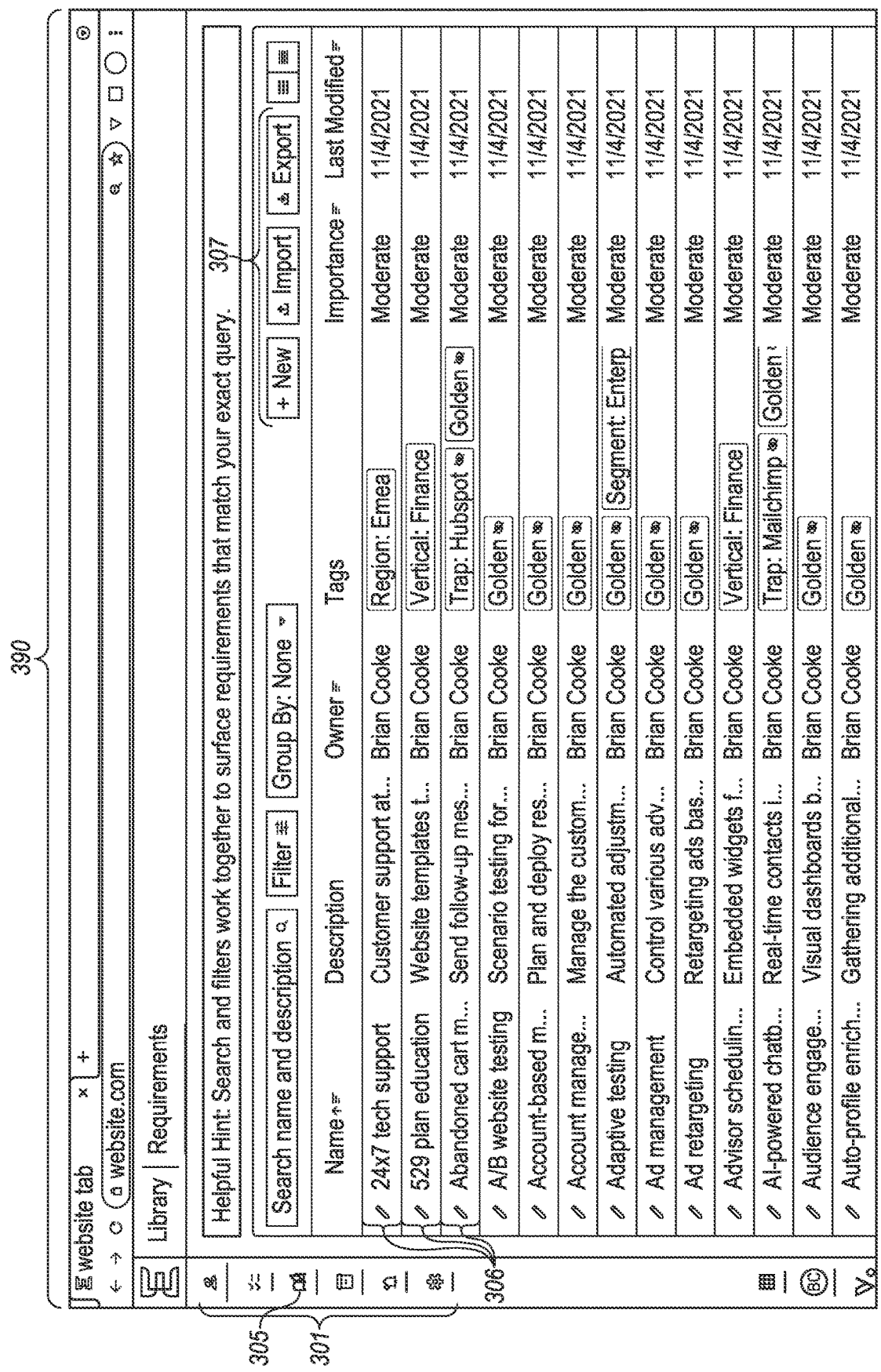
FIG. 4B illustrates an example computer display device that has rendered and is displaying a graphical user interface having a "library" page of requirements of the platform, in one embodiment.
Figure 4C:
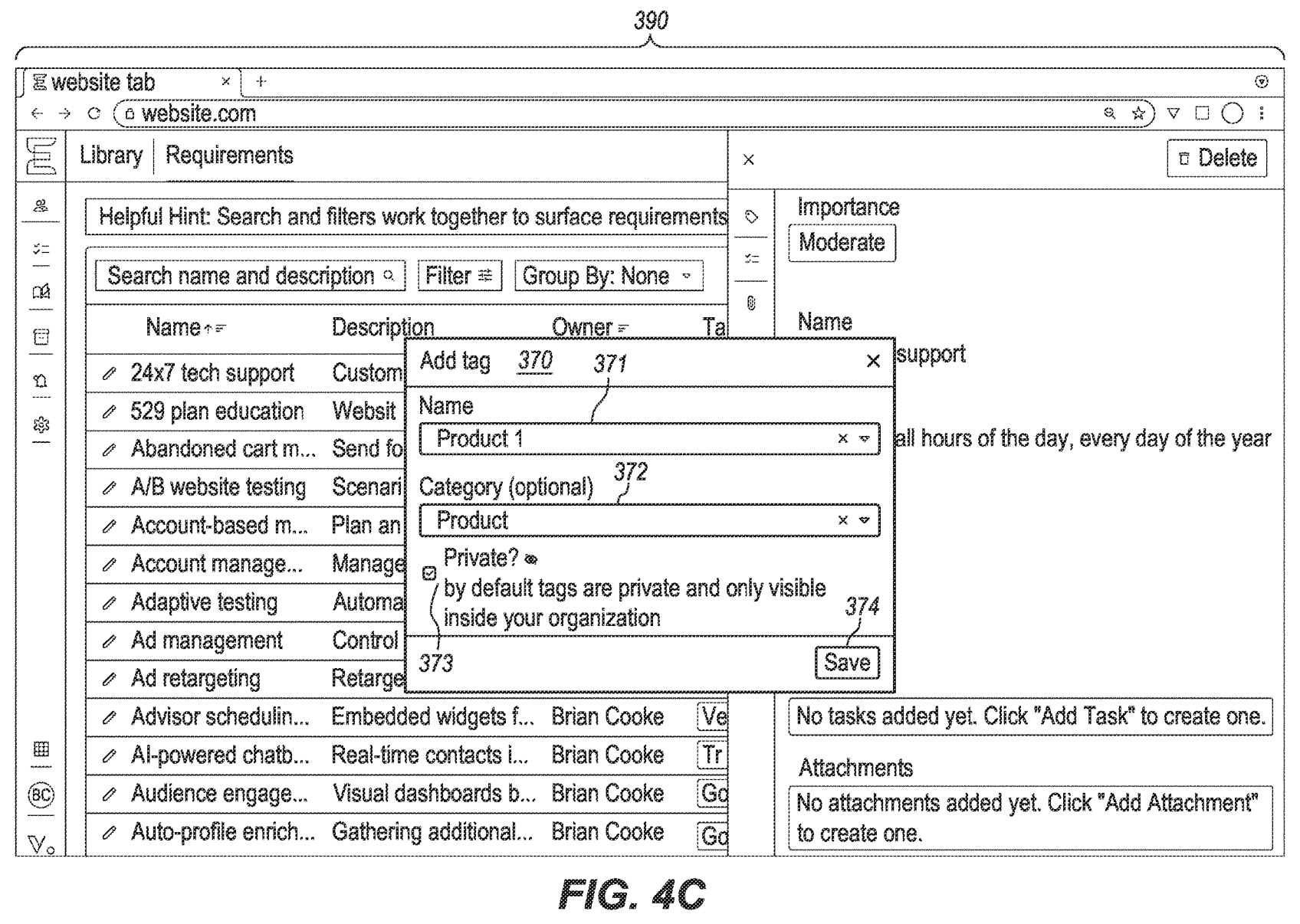
Figure 4D:
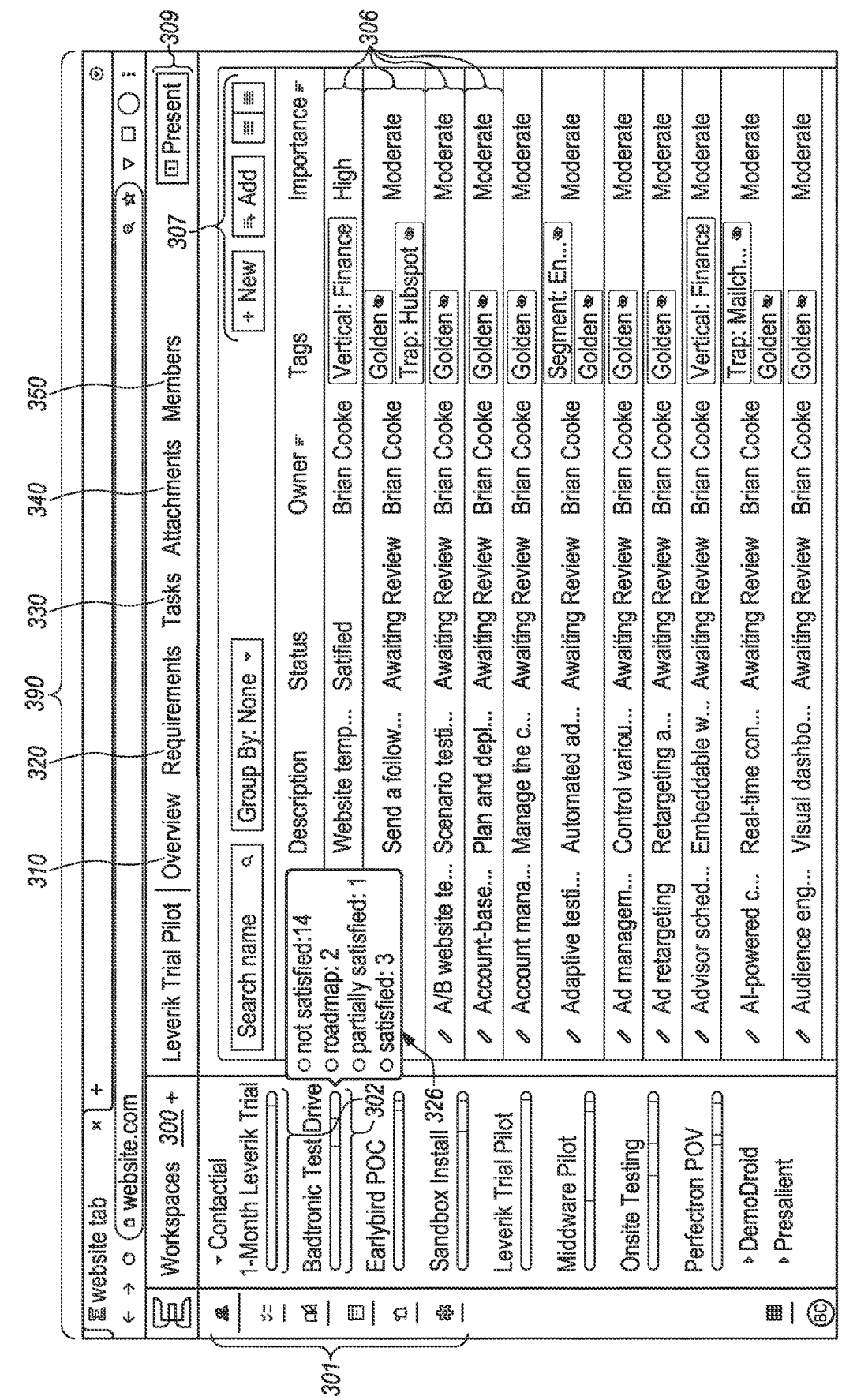
FIG. 4D illustrates an example computer display device that has rendered and is displaying a graphical user interface having a pop-up analytics element displayed proximal to a workspace nav, in one embodiment.

FIG. 4D illustrates a "requirements" tab of a digital electronic workspace with a pop-up analytics element displayed proximal to a workspace nav, in one embodiment. In particular embodiments, various digital requirement objects are represented in the "requirements" tab of the digital electronic workspace as requirement rows 306, each having a plurality of fields comprising a "name" field, a "description" field, a "status" field, an "owner" field, a "tags" field, and an "importance" field. The "name" and "description" field may comprise representations of natural language text describing the feature of the project or product represented by the particular requirement object. Each requirement object may take on one of a variety of different requirement statuses such as "AwaitingReview," "UnderReview," "Satisfied," "Partially Satisfied," "NotSatisfied," "Roadmap," "Exempt," "Withdrawn," or "PendingAgreement." The status of a requirement may be digitally updated in the computer memory by changing a state value of a variable to a value that indicates a corresponding requirement status for that requirement. Said values may indicate whether designated accounts, such as the first account and the second account associated with the workspace agree that the project or product possesses the feature described in the natural language text summary digitally represented by the requirement object with the particular status. For example, FIG. 4D shows that the owner of the requirements is "Brian Cooke," thus the user account of Brian Cooke may be one such designated account capable of updating the status of those requirements, as described further herein with greater specificity. As depicted in FIG. 4D, in particular embodiments, certain ones of the digital requirement objects of the set of digital requirement objects are associated with one or more tags, respectively. One or more tags for each of the certain ones of the digital requirement objects may be displayed in the "tags" field. In particular embodiments, the "importance" field displays a level of importance set for the requirement object of the requirement row which is determined by digital input received from a user account associated with the digital electronic workspace.

In particular embodiments, a pop-up analytics element 326 can be displayed on the workspace nav 300 when a user hovers over a progress bar 302 for a digital electronic workspace using an input device. In particular embodiments, the pop-up analytics element 326 comprises data indicating a level of completion of the requirements of the hovered workspace. For example, in the depiction of FIG. 4D, the pop-up analytics element 326 indicates that for the "Badtronic Test Drive" digital electronic workspace 302, 14 requirements have the status "Not Satisfied," 2 requirements have the status "Roadmap," 1 requirement has the status "Partially Satisfied," and 3 requirements have the status "Satisfied." These statuses can also be reflected in the progress bar of the "Badtronic Test Drive" as described previously herein, such that requirements that are not satisfied show up in the color red, while requirements that are satisfied show up in the color green, and the like. Notably, as depicted in FIG. 4D, the pop-up analytics element 326 does not necessarily correspond to the statuses of the digital requirements objects depicted in the digital requirements objects of the digital electronic workspace (LEVERIK TRIAL PILOT 7890) depicted in the displayed requirements tab, but rather corresponds to the hovered digital electronic workspace.

In one embodiment, process 200 is programmed to execute step 235 by receiving, from the first account or a third account associated with the first account, a second input indicating a first set of one or more of the digital requirement objects. In one embodiment, process 200 is programmed to execute step 245 responsive to receiving the second input, associating the first set of one or more of the digital requirement objects with the unique identifier. For example, a reference to the unique identifier can be stored with the digital data of the set of the one or more digital requirement objects in the database.

FIG. 4B illustrates a "library" page of requirements of the platform, in one embodiment. In particular embodiments, the "library" page features requirement rows 306 representing digital requirement objects that can be added to a desired digital electronic workspace by an associated user account with the requisite permissions. In particular embodiments, a user account may select a particular requirement with an input device, triggering the platform to launch a prompt that allows the user account to select a particular digital electronic workspace to add the requirement to. Moreover, in particular embodiments, the "library" page comprises a search bar and/or filter controls that allows a user account to drill down to find a desired set of digital requirement objects to add to a desired digital electronic workspace. For example, a user account can search within the library of digital requirement objects to find the digital requirement objects that have been labeled with a particular tag. In particular embodiments, the filtered set of desired digital requirement objects can be added to the desired digital electronic workspace together in a batch. In particular embodiments, the "library" page includes control buttons 307 that allow for the addition of new digital requirement objects or the importation/exportations of one or more digital requirement objects of the library.

Thus, in particular embodiments, the first set of one or more of the digital requirement objects could be a set of digital requirement objects added to the digital electronic workspace using the "library" page depicted in FIG. 4B. For example, the first account or the third account could use the filter and/or search functionality of the "library" page to find and select a plurality of digital requirement objects having particular tags to add to a desired digital electronic workspace. Then, the user account could transmit an input formatted to add those selected digital requirement objects to the desired digital electronic workspace. Responsive to receiving that input, server computer 110 could then cause the selected digital requirement objects to be associated with the unique identifier of the desired digital electronic workspace.

FIG. 3I1 illustrates a "task" tab of a digital electronic workspace, in one embodiment. In particular embodiments, each task of the "task" tab can be represented in the GUI as a task row 369 of a task panel 366 that comprises one or more of the name of the task, the owner of the task, the status of the task, the priority of the task, the name of the account assigned to the task, and a due date for the task. Tasks (represented by task rows 369) can be associated with a specific digital requirement object or they can exist without an association to a specific digital requirement object. The tasks may also be grouped using a grouping button 368.

In one embodiment, process 200 is programmed to execute step 255 by receiving, from the second account, a third input to generate and digitally store an additional digital requirement object in the computer memory. In particular embodiments, control buttons 307 (FIG. 4D) can be used to receive input from a user account to create a new digital requirement object as described further herein with greater specificity. In one embodiment, process 200 is programmed to execute step 265 by associating the additional digital requirement object with the unique identifier. For example, a reference to the unique identifier can be stored with the digital data of the additional digital requirement object in the database.

Figure 3D:
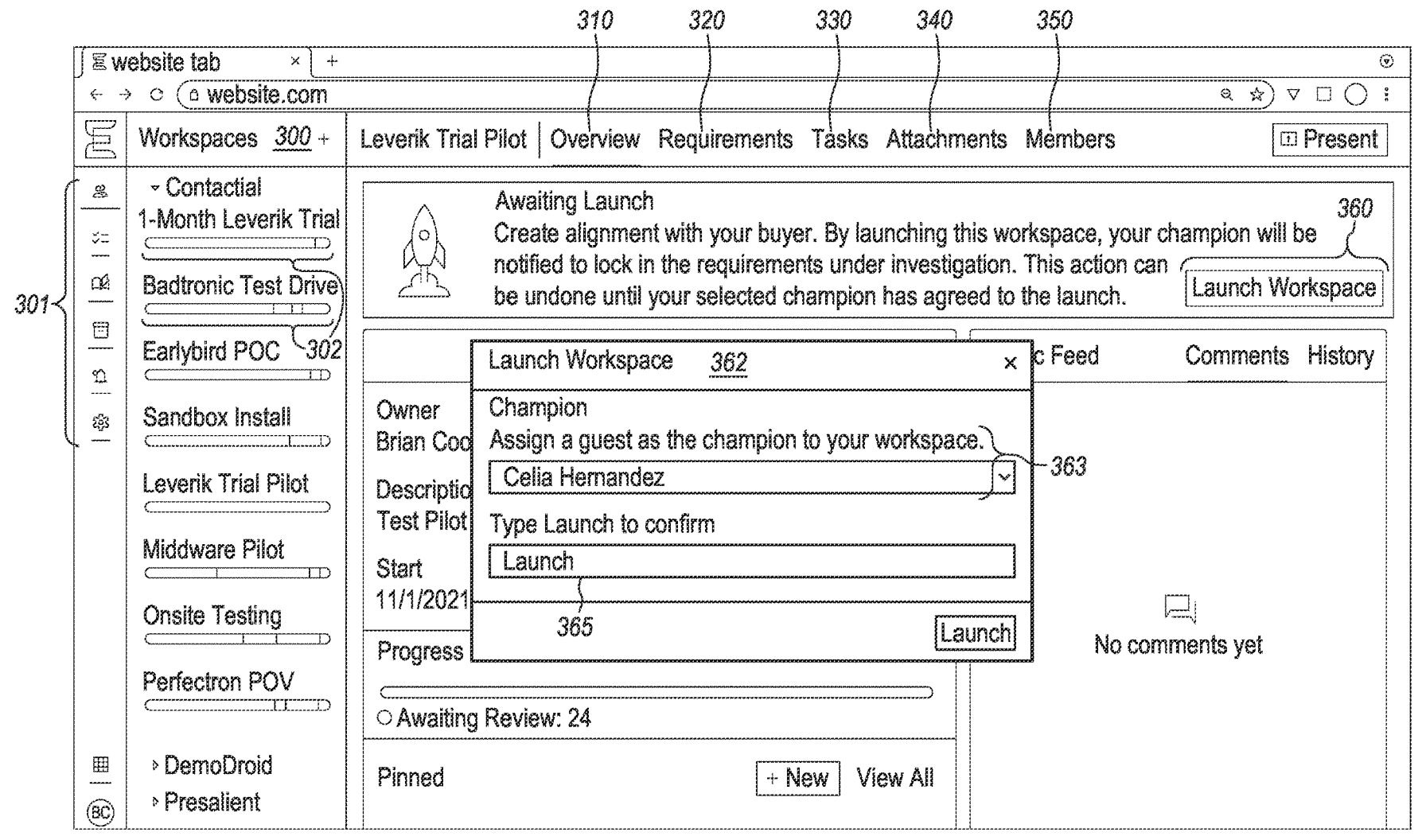
Figure 3E:
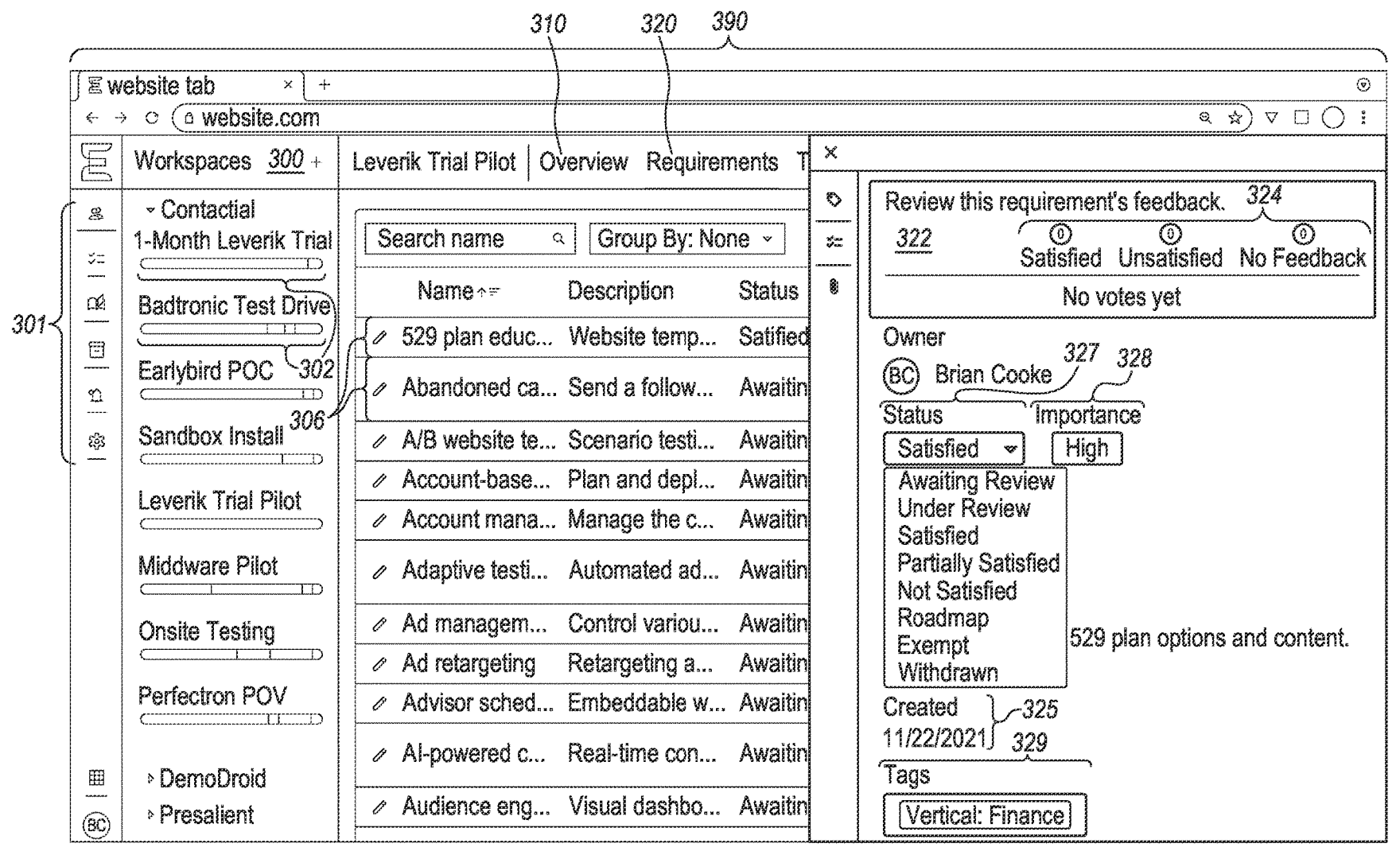

FIG. 3E illustrates changing the status of a digital requirement object stored in computer memory, in one embodiment. In particular embodiments, responsive to receiving input from an account on a graphical element of a requirement row 306, the platform may cause a requirement status panel 322 to populate in GUI 390. The requirement status panel may comprise feedback elements 324 that indicate whether accounts associated with the digital electronic workspace have indicated that the project or product possesses the feature described by the natural language text summary represented by the requirement object corresponding to the selected requirement row 306. The requirement status pane 322 may also have a graphical element such as drop-down menu 327 that can be used by an authorized account associated with the digital electronic workspace to change the status of the digital requirement object associated with the selected requirement row 306. For example, if the user account believes that the project or product possess the feature, then the account can select the "Satisfied" status from the drop-down menu 327. When server compute 110 receives such input, server computer 110 can execute programmed instructions to update the status of the requirement object in the database.

In particular embodiments, the requirement status panel comprises one or more additional graphical elements displayed in GUI 390. In particular embodiments, the requirement status panel may comprise an importance element 328 which can be used to update the importance of the digital requirement object similarly to the updating of the status as described above. In particular embodiment, the options for importance digitally stored in the database may comprise "High," "Medium," and "Low," however other values are also possible. In particular embodiments, date stamp element 325 records the date that the digital requirement object was created. In particular embodiments, a tag element 329 can be used to change which tags are associated with the digital requirement object corresponding to the selected requirement row 306.

FIG. 4C illustrates a prompt for adding a tag to a digital requirement object, in one embodiment. In particular embodiments, the platform can cause the depicted tag prompt 370 to be displayed in GUI 390 when the tag element 329 (FIG. 3E is selected). In particular embodiments, the tag prompt 370 can be used to add, change, or remove tags of a digital requirement object. In particular embodiments each tag can comprise one or more of a name which can be input using a name drop-down 371 or other input element or a category which can be input using a category drop down 372 or other input element. The tags may also each be associated with privacy settings selectable via a privacy checkbox 373 which can determine whether a particular tag is viewable by accounts associated with a second account associated with an entity or organization evaluating a project or product or only by accounts associated with a first account providing or selling the project or product which is the subject of the digital electronic workspace. A save element 374 can be used to transmit input to server computer 110, causing server computer 110 to update the tag of the digital requirement associated with the requirement row 306 in the database.

Referring again to FIG. 2, in one embodiment, process 200 is programmed to execute step 275 by receiving, from the first account and the second account respectively, a fourth input and a fifth input, each of the fourth input and the fifth input indicating a consensus that the project should possess each potential feature described in each natural language text summary digitally represented by each digital requirement object associated with the unique identifier.

FIG. 3D illustrates a prompt for changing the state of a digital electronic workspace to a "launched" state such that new digital requirement objects can only be associated with the workspace responsive to receiving input indicating two-party assent, in one embodiment. In particular embodiments, a launch panel 362 can be populated in the GUI 390 responsive to receiving input indicating that a user selected a launch workspace button 360. In particular embodiments, the launch panel 362 can then be used to send input to server computer 110 to launch the workspace. In particular embodiments, a confirmation field 365 can be used to confirm the choice to "launch" the workspace. In particular embodiments, the launch panel 362 can also be used to select a user account to be the "Champion" of the workspace, which means that account will become permissioned by the platform (along with the first account/workspace owner) to subsequently transmit input to server computer 110 indicating that the project should possesses each feature described in each natural language text summary digitally represented by each digital requirement object associated with the unique identifier.

In one embodiment, process 200 is programmed to execute step 285 responsive to receiving the fourth input and the fifth input, changing a state value of a variable associated with the unique identifier from a prior state to a new state, the new state indicating that new digital requirement objects can only be associated with the unique identifier responsive to receiving a digital input indicating assent from each of the first account and the second account. In one embodiment, process 200 is programmed to execute step 295 by displaying, in a graphical user interface (GUI) 390, an indication that the state value of the variable has been changed to the new state. For example, the word "launched" might be populated in frame 304 of the overview tab of the digital electronic workspace (FIG. 3A & FIG. 3B) indicating the new state of the digital electronic workspace.

Figure 3F:
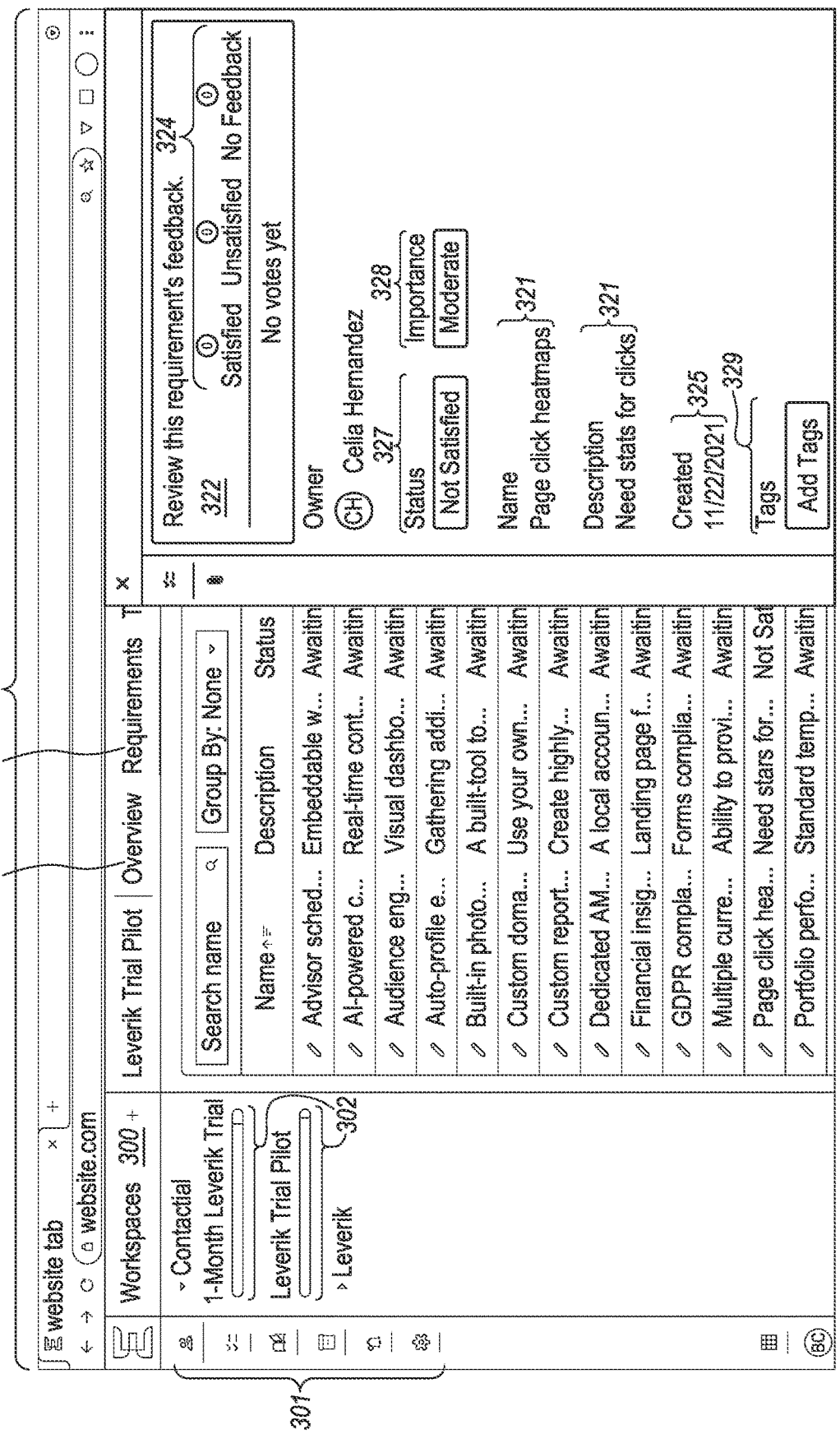
FIG. 3F illustrates an example computer display device that has rendered and is displaying a graphical user interface having a panel indicating received digital feedback related to whether a project possesses a specific feature corresponding to a specific digital requirement object, in one embodiment.
Figure 3G:
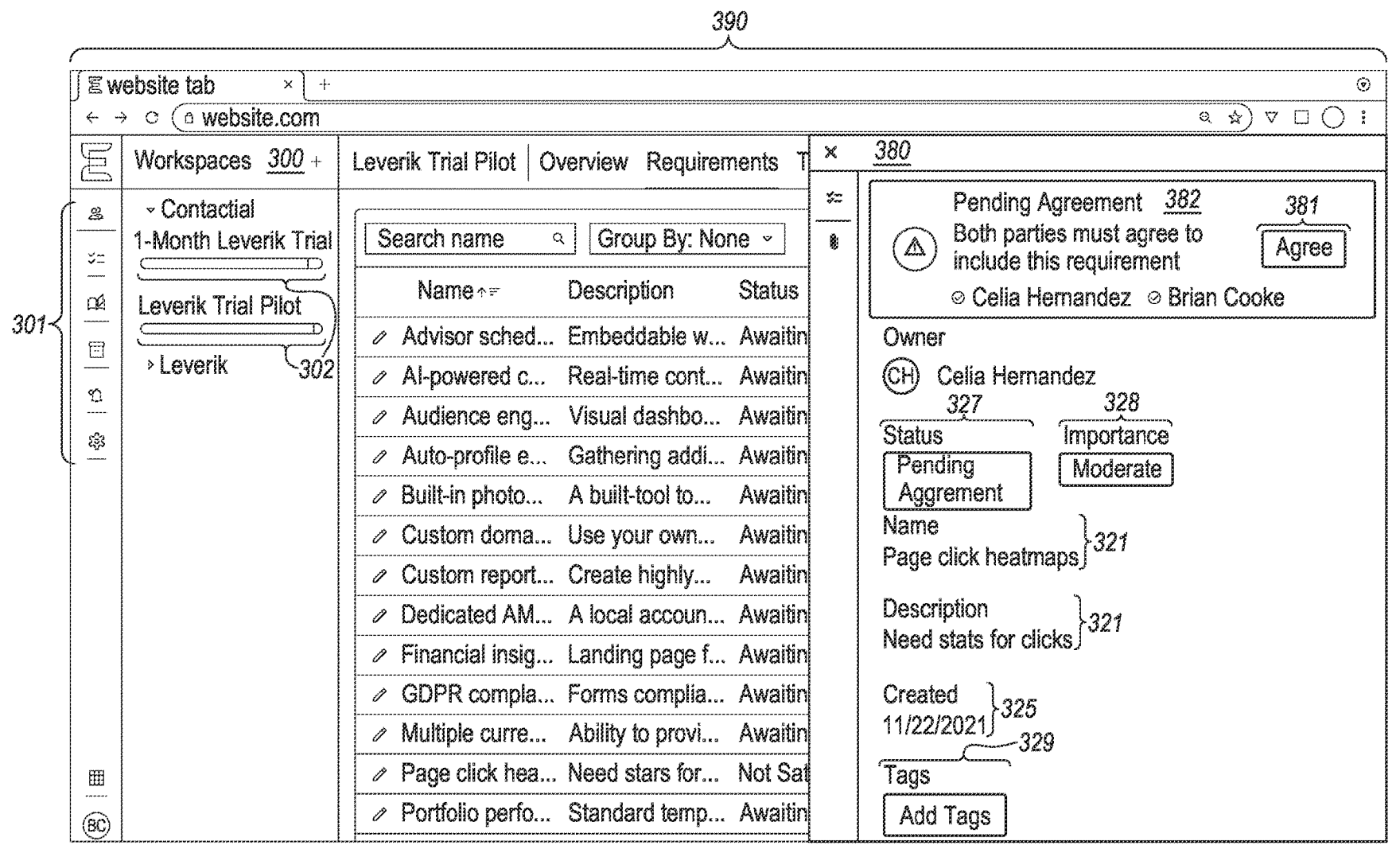

FIG. 3G illustrates a prompt for an account to provide assent to a new digital requirement object being added to a digital electronic workspace "post-launch," in one embodiment. When server computer 110 receives input from a user account attempting to add a new requirement after the digital electronic workspace is in the "launched" state, it may cause a post-launch requirement panel 380 to be populated in GUI 390. In particular embodiments, an agreement field 382 indicates whether the properly permissioned user accounts have agreed that a new digital requirement object should be created for a new requirement for the project or product. In particular embodiments, the properly permissioned account can use an agree button 381 to transmit input to server computer 110 assenting to the creation of the new digital requirement object. In particular embodiments, a post-launch status field 397 indicates whether the first and second account have assented to the creation of the additional digital requirement object and the association of the additional digital requirement object with the digital electronic workspace and/or its unique identifier. In particular embodiments, description fields 321 may comprise natural language text summaries of the feature of the additional digital requirement object. FIG. 3F illustrates a panel indicating received digital feedback related to whether a project possesses a specific feature corresponding to a specific digital requirement object, in one embodiment. In particular embodiments, the panel of FIG. 3F might be displayed in GUI 390 for a digital electronic workspace that has already been launched.

In particular embodiments, server computer 110 may receive, from each of the first account and the second account, inputs indicating that the project possesses each feature described in each natural language text summary digitally represented by each digital requirement object associated with the unique identifier. Responsive to receiving these inputs, server computer 110 may cause to be displayed in the GUI, an indication that the first account and the second account each have determined that the product possesses each feature described in each natural language text summary digitally represented by each digital requirement object associated with the unique identifier. For example, in the display of FIG. 3A, the Progress bar 306 could indicate that no requirements are not Satisfied and that all requirements have the status of Satisfied or a neutral state such as Withdrawn. Furthermore, the Completed date in frame 304 could be filled in and the Status value in that panel could be Complete.

4.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
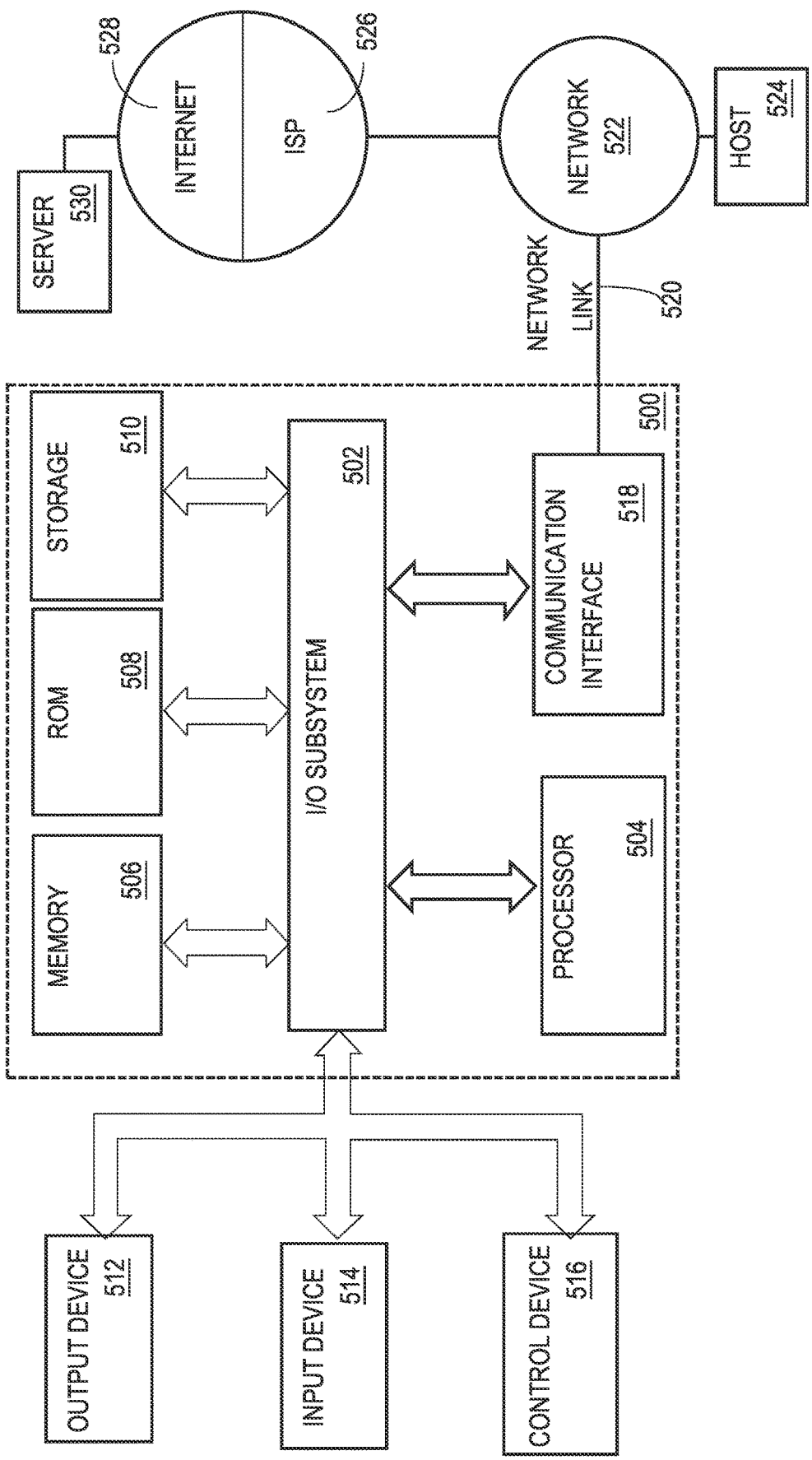
FIG. 5 is a block diagram that illustrates a computer system upon which one embodiment may be implemented.

For example, FIG. 5 is a block diagram that illustrates a computer system 500 upon which one embodiment may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (for example, x) and a second axis (for example, y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (for example, private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method comprising:
generating and digitally storing, in computer memory, a unique identifier associated with a digital electronic workspace, the digital electronic workspace being associated with a project, a first account, and a second account;
receiving, from the first account, a first input formatted to grant a plurality of permissions to the digital electronic workspace to a second account;
generating and digitally storing, in the computer memory, initial requirements data comprising a plurality of digital requirement objects, each digital requirement object comprising a digital electronic representation of a natural language text summary, each natural language text summary describing a potential feature of the project;
receiving, from the first account or a third account associated with the first account, a second input indicating a first set of one or more of the digital requirement objects;
responsive to receiving the second input, associating the first set of one or more of the digital requirement objects with the unique identifier;
receiving, from the second account, a third input to generate and digitally store an additional digital requirement object in the computer memory;
associating the additional digital requirement object with the unique identifier;
receiving, from the first account and the second account respectively, a fourth input and a fifth input, each of the fourth input and the fifth input indicating that the project should possess each potential feature described in each natural language text summary digitally represented by each digital requirement object associated with the unique identifier;
responsive to receiving the fourth input and the fifth input, changing a state value of a variable associated with the unique identifier from a prior state to a new state, the new state indicating that new digital requirement objects can only be associated with the unique identifier responsive to receiving a digital input indicating assent from each of the first account and the second account; and
displaying, in a graphical user interface (GUI), an indication that the state value of the variable has been changed to the new state.

2. The computer-implemented method of claim 1, the unique identifier being further associated with workspace data stored in computer memory, the workspace data being formatted to represent in the computer memory a workspace name, a description, a start date, and a due date, and the workspace name and the description each comprising natural language text.

3. The computer-implemented method of claim 1, further comprising:
storing, in a database, a set of digital requirement objects comprising the plurality of digital requirement objects comprised by the initial requirements data, certain ones of the digital requirement objects of the set of digital requirement objects being associated with one or more tags respectively;
receiving, from the first account, a sixth input selecting one or more particular tags; and
causing to be displayed, in the GUI, one or more particular digital requirement objects that are associated with one or more of the one or more particular tags.

4. The computer-implemented method of claim 1, further comprising:
receiving, from the second account or a fourth account associated with the second account, a seventh input indicating that the project possesses a specific feature described in a specific natural language text summary digitally represented by a specific digital requirement object associated with the unique identifier; and
responsive to receiving the seventh input, displaying, in the GUI, an indication that the second account or the fourth account has determined that the project possesses the specific feature.

5. The computer-implemented method of claim 1, further comprising:
digitally storing, in a database, an electronic historical record documenting a set of changes made to the digital electronic workspace, the set of changes documented by the electronic historical recording including changes made responsive to the third input, the fourth input, and the fifth input and comprising a representation of a particular account that initiated each change of the set of changes, respectively; and
displaying, in the GUI, a representation of the electronic historical record.

6. The computer-implemented method of claim 1, further comprising:
receiving, from each of the first account and the second account, an eighth input and a ninth input, respectively, each of the eighth input and the ninth input indicating that the project possesses each feature described in each natural language text summary digitally represented by each digital requirement object associated with the unique identifier; and responsive to receiving the eighth input and the ninth input, displaying, in the GUI, an indication that the first account and the second account each has determined that the product possesses each feature described in each natural language text summary digitally represented by each digital requirement object associated with the unique identifier.

7. The computer-implemented method of claim 1, wherein the digital electronic workspace associated with the unique identifier is a first digital electronic workspace of a set of one or more digital electronic workspaces, the method further comprising:

displaying, in a panel of the GUI, one or more links to the one or more digital electronic workspaces of the set of digital electronic workspaces, respectively; and displaying, in the panel of the GUI, one or more progress bars corresponding to the one or more links, the one or more progress bars indicating a completion level of the corresponding one of the one or more digital electronic workspaces of the set of digital electronic workspaces.

8. One or more non-transitory storage media storing instructions which, when executed by one or more processors, cause performance of a method, the method comprising:

generating and digitally storing, in computer memory, a unique identifier associated with a digital electronic workspace, the digital electronic workspace being associated with a project, a first account, and a second account;

receiving, from the first account, a first input formatted to grant a plurality of permissions to the digital electronic workspace to a second account;

generating and digitally storing, in the computer memory, initial requirements data comprising a plurality of digital requirement objects, each digital requirement object comprising a digital electronic representation of a natural language text summary, each natural language text summary describing a potential feature of the project;

receiving, from the first account or a third account associated with the first account, a second input indicating a first set of one or more of the digital requirement objects;

responsive to receiving the second input, associating the first set of one or more of the digital requirement objects with the unique identifier;

receiving, from the second account, a third input to generate and digitally store an additional digital requirement object in the computer memory;

associating the additional digital requirement object with the unique identifier;

receiving, from the first account and the second account respectively, a fourth input and a fifth input, each of the fourth input and the fifth input indicating a consensus that the project should possess each potential feature described in each natural language text summary digitally represented by each digital requirement object associated with the unique identifier;

responsive to receiving the fourth input and the fifth input, changing a state value of a variable associated with the unique identifier from a prior state to a new state, the new state indicating that new digital requirement objects can only be associated with the unique identifier responsive to receiving a digital input indicating assent from each of the first account and the second account; and displaying, in a graphical user interface (GUI), an indication that the state value of the variable has been changed to the new state.

9. The storage media of claim 8, the unique identifier being further associated with workspace data stored in computer memory, the workspace data being formatted to represent in the computer memory a workspace name, a description, a start date, and a due date, and the workspace name and the description each comprising natural language text.

10. The storage media of claim 8, further comprising sequences of instructions which when executed cause the one or more processors to perform:

storing, in a database, a set of digital requirement objects comprising the plurality of digital requirement objects comprised by the initial requirements data, certain ones of the digital requirement objects of the set of digital requirement objects being associated with one or more tags, respectively;

receiving, from the first account, a sixth input selecting one or more particular tags; and causing to be displayed, in the GUI, one or more particular digital requirement objects that are associated with one or more of the one or more particular tags.

11. The storage media of claim 8, further comprising sequences of instructions which when executed cause the one or more processors to perform:

receiving, from the second account or a fourth account associated with the second account, a seventh input indicating that the project possesses a specific feature described in a specific natural language text summary digitally represented by a specific digital requirement object associated with the unique identifier; and responsive to receiving the seventh input, displaying, in the GUI, an indication that the second account or the fourth account has determined that the project possesses the specific feature.

12. The storage media of claim 8, further comprising sequences of instructions which when executed cause the one or more processors to perform:

digitally storing, in a database, an electronic historical record documenting a set of changes made to the digital electronic workspace, the set of changes documented by the electronic historical recording including changes made responsive to the third input, the fourth input, and the fifth input and comprising a representation of a particular account that initiated each change of the set of changes, respectively; and displaying, in the GUI, a representation of the electronic historical record.

13. The storage media of claim 8, further comprising sequences of instructions which when executed cause the one or more processors to perform:

receiving, from each of the first account and the second account, an eighth input and a ninth input, respectively, each of the eighth input and the ninth input indicating that the project possesses each feature described in each natural language text summary digitally represented by each digital requirement object associated with the unique identifier; and responsive to receiving the eighth input and the ninth input, displaying, in the GUI, an indication that the first account and the second account each has determined that the product possesses each feature described in each natural language text summary digitally represented by each digital requirement object associated with the unique identifier.

14. The storage media of claim 8, wherein the digital electronic workspace associated with the unique identifier is a first digital electronic workspace of a set of one or more digital electronic workspaces, the storage media further comprising sequences of instructions which when executed cause the one or more processors to perform:
displaying, in a panel of the GUI, one or more links to the one or more digital electronic workspaces of the set of digital electronic workspaces, respectively; and
displaying, in the panel of the GUI, one or more progress bars corresponding to the one or more links, the one or more progress bars indicating a completion level of the corresponding one of the one or more digital electronic workspaces of the set of digital electronic workspaces.

15. A computer system comprising:
one or more processors; and
one or more computer-readable non-transitory storage media coupled to one or more of the processors and storing instructions operable when executed by one or more of the processors to cause the one or more processors to perform:
generating and digitally storing, in computer memory, a unique identifier associated with a digital electronic workspace, the digital electronic workspace being associated with a project, a first account, and a second account;
receiving, from the first account, a first input formatted to grant a plurality of permissions to the digital electronic workspace to a second account;
generating and digitally storing, in the computer memory, initial requirements data comprising a plurality of digital requirement objects, each digital requirement object comprising a digital electronic representation of a natural language text summary, each natural language text summary describing a potential feature of the project;
receiving, from the first account or a third account associated with the first account, a second input indicating a first set of one or more of the digital requirement objects;
responsive to receiving the second input, associating the first set of one or more of the digital requirement objects with the unique identifier;
receiving, from the second account, a third input to generate and digitally store an additional digital requirement object in the computer memory;
associating the additional digital requirement object with the unique identifier;
receiving, from the first account and the second account respectively, a fourth input and a fifth input, each of the fourth input and the fifth input indicating a consensus that the project should possess each potential feature described in each natural language text summary digitally represented by each digital requirement object associated with the unique identifier;
responsive to receiving the fourth input and the fifth input, changing a state value of a variable associated with the unique identifier from a prior state to a new state, the new state indicating that new digital requirement objects can only be associated with the unique identifier responsive to receiving a digital input indicating assent from each of the first account and the second account; and
displaying, in a graphical user interface (GUI), an indication that the state value of the variable has been changed to the new state.

16. The system of claim 15, the unique identifier being further associated with workspace data stored in computer memory, the workspace data being formatted to represent in the computer memory a workspace name, a description, a start date, and a due date, and the workspace name and the description each comprising natural language text.

17. The system of claim 15, the storage media further comprising instructions which when executed by one or more of the processors cause the system to perform:
storing, in a database, a set of digital requirement objects comprising the plurality of digital requirement objects comprised by the initial requirements data, certain ones of the digital requirement objects of the set of digital requirement objects being associated with one or more tags, respectively;
receiving, from the first account, a sixth input selecting one or more particular tags; and
causing to be displayed, in the GUI, one or more particular digital requirement objects that are associated with one or more of the one or more particular tags.

18. The system claim 15, the storage media further comprising instructions which when executed by one or more of the processors cause the system to perform:
receiving, from the second account or a fourth account associated with the second account, a seventh input indicating that the project possesses a specific feature described in a specific natural language text summary digitally represented by a specific digital requirement object associated with the unique identifier; and
responsive to receiving the seventh input, displaying, in the GUI, an indication that the second account or the fourth account has determined that the project possesses the specific feature.

19. The system of claim 15, the storage media further comprising instructions which when executed by one or more of the processors cause the system to perform:
digitally storing, in a database, an electronic historical record documenting a set of changes made to the digital electronic workspace, the set of changes documented by the electronic historical recording including changes made responsive to the third input, the fourth input, and the fifth input and comprising a representation of a particular account that initiated each change of the set of changes, respectively; and
displaying, in the GUI, a representation of the electronic historical record.

20. The system of claim 15, the storage media further comprising instructions which when executed by one or more of the processors cause the system to perform:
receiving, from each of the first account and the second account, an eighth input and a ninth input, respectively, each of the eighth input and the ninth input indicating that the project possesses each feature described in each natural language text summary digitally represented by each digital requirement object associated with the unique identifier; and
responsive to receiving the eighth input and the ninth input, displaying, in the GUI, an indication that the first account and the second account each has determined that the product possesses each feature described in each natural language text summary digitally represented by each digital requirement object associated with the unique identifier.

* * * * *